United States Patent [19]

Zimmerman

[11] Patent Number: 5,607,270
[45] Date of Patent: Mar. 4, 1997

[54] RETENTION SYSTEM FOR TRANSPORTING SKI-TYPE VEHICLES

[76] Inventor: Karl M. Zimmerman, 16464 Crosstown Blvd., Andover, Minn. 55304

[21] Appl. No.: 234,179

[22] Filed: Apr. 28, 1994

[51] Int. Cl.$^6$ ..................................................... B60P 7/08
[52] U.S. Cl. ................... 410/3; 410/7; 410/81
[58] Field of Search .......................... 410/2–4, 7, 9–11, 410/19, 30, 81; 414/485; 280/63, 415.1, 789

[56] References Cited

U.S. PATENT DOCUMENTS

| | | |
|---|---|---|
| 3,672,523 | 6/1972 | Albert ...................................... 410/3 X |
| 3,730,552 | 5/1973 | Clark ............................................ 410/3 |
| 3,885,690 | 5/1975 | Van Slambrouck . |
| 3,955,847 | 5/1976 | Schiowitz .............................. 410/30 X |
| 4,222,698 | 9/1980 | Boelter ................................. 414/485 X |
| 4,281,950 | 8/1981 | Lehman et al. . |
| 4,475,762 | 10/1984 | DeLong et al. ........................ 410/19 X |
| 5,044,845 | 9/1991 | Baker, Jr. . |
| 5,203,655 | 4/1993 | Persau . |
| 5,387,070 | 2/1995 | Roeling .................................. 410/3 X |

FOREIGN PATENT DOCUMENTS

2-6244  1/1990  Japan ......................................... 410/2

*Primary Examiner*—Karen B. Merritt
*Assistant Examiner*—Stephen Gordon
*Attorney, Agent, or Firm*—Merchant, Gould, Smith, Edell, Welter & Schmidt, P.A.

[57] ABSTRACT

The present invention provides a retention system for the transport of snowmobiles and other ski-type vehicles. An L-shaped bar includes a keyed shaft and a handle extending at an acute angle from an end of the shaft. A key on the shaft is designed to pass through one or more keyholes when in a first orientation relative thereto, but to resist passage when in a second orientation relative thereto. Once a vehicle is loaded onto a trailer between a pair of brackets through which keyholes are formed, the key is manipulated into the first orientation and inserted through the near bracket, over the skis of the vehicle, and through the far bracket. The handle is then pulled away from the shaft and rotated to the second orientation, at which point, the handle is released and allowed to travel back toward the shaft and into a secured position relative to the trailer.

16 Claims, 5 Drawing Sheets

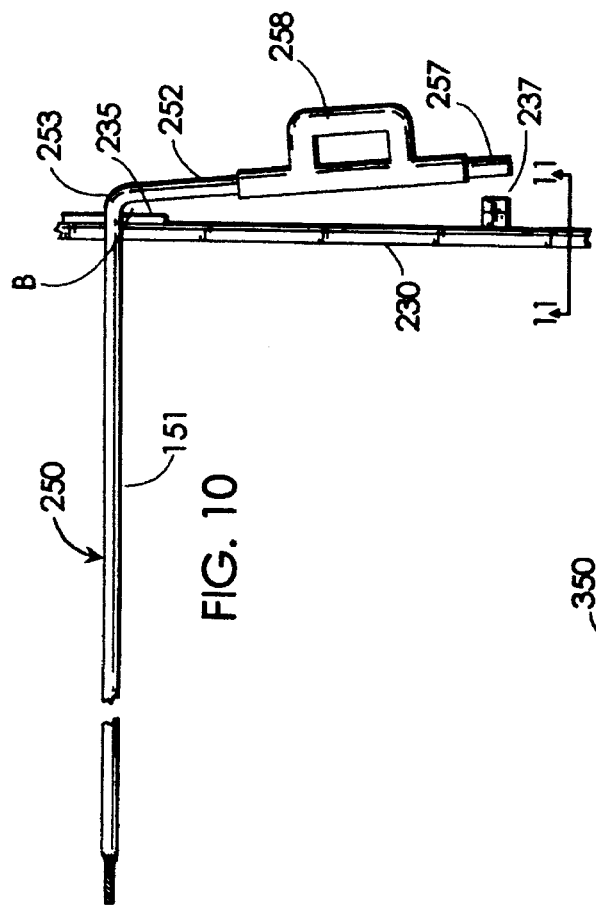
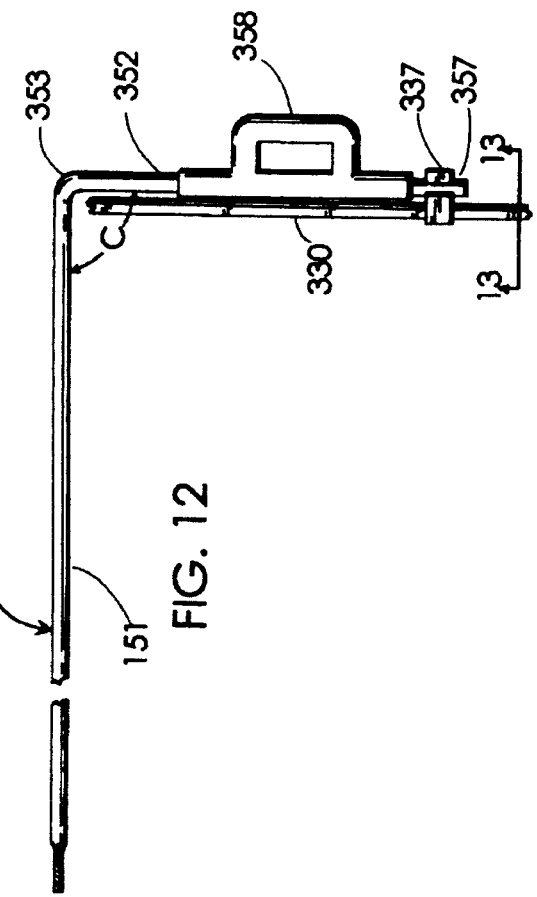
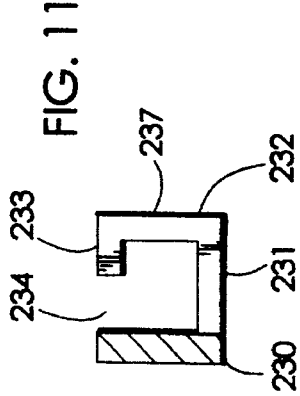
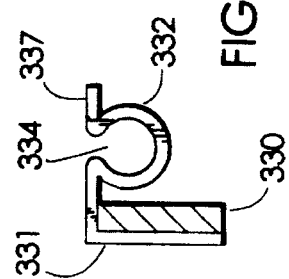

RETENTION SYSTEM FOR TRANSPORTING SKI-TYPE VEHICLES

FIELD OF THE INVENTION

The present invention relates generally to transport apparatus, and more particularly, to a new and improved retention system for securing a ski-type vehicle, such as a snowmobile, to a trailer bed or other support surface.

BACKGROUND OF THE INVENTION

The invention of the snowmobile naturally gave rise to a need for reliable transportation of snowmobiles hither and yon, and the same can be said for other ski-type vehicles, such as the jet-ski. Recognizing that these ski-type vehicles are often transported to remote areas under less than ideal road conditions, a transport device for such vehicles should be durable as well as reliable. Further recognizing that snowmobiles, in particular, are often loaded and unloaded in very cold weather, a snowmobile transport device should also be convenient to operate regardless of the weather conditions. As discussed below, others have attempted to address the need for such a transport device, but with only limited success.

U.S. Pat. No. 3,885,690 to Van Slambrouck discloses a snowmobile trailer that is designated as 10 and labeled as "Prior Art" in FIGS. 1 and 2 herein. The trailer 10 includes hold down rods 40 that extend from either of two side rails 32 to an intermediate bracket 38 mounted on the trailer bed 28. The rods 40 are secured in place by means of cotter pins 48, or alternatively, by threading the ends of the rods 40 into holes 44 formed through the intermediate bracket 38. The more accessible end of each rod 40 is bent at a right angle relative to the length of the rod to provide a crude handle 46 for grasping the rod.

The shortcomings of the Van Slambrouck device include the manner in which the hold down rods are locked relative to the side rails and brackets. In this regard, the insertion and removal of cotter pins is cumbersome, particularly in very cold weather. The alternative of threading the distal end of the rod through a hole in the bracket is also cumbersome in cold weather, and even more so once ice, rust, or other debris has accumulated on the distal end of the rod and/or within the hole through the bracket.

U.S. Pat. No. 4,281,950 to Lehman et al. discloses a wheelbarrow trailer having a pair of T-shaped hold down bars that cooperate with a pair of dual slot brackets. In a first locked position, the stem of the T-shape occupies a first slot, and the cross member of the T-shape does not extend across a wheelbarrow leg. In a second locked position, the stem occupies a second slot, and the cross member of the T-shape does extend across a wheelbarrow leg. A quarter turn of either bar about the axis of the cross member rotates the stem of the T-shape out of engagement with either of the slots to allow axial movement of the bar relative to the slots and the wheelbarrow leg.

The Lehman et al. retention system is designed for transport of a wheelbarrow at relatively low speed and across relatively flat terrain (note the small wheel base of the trailer wheels). No provision is made for positively locking the hold down bars in the second slots. Thus, the Lehman et al. retention system is not well suited for transport of ski-type vehicles at highway speeds and/or across uneven terrain.

U.S. Pat. No. 5,044,845 to Baker, Jr. discloses a snowmobile trailer having a hold down bar that extends across an intermediate portion of the trailer bed. A plurality of hooks extend up through the bed of the trailer to capture the bar, and spring loaded levers bias the hooks downward to retain the bar.

The Baker, Jr. retention system has moving parts and requires significant modification of most, if not all, conventional types of trailers used to transport snowmobiles and the like. The moving parts introduce significant additional expense into the manufacturing costs and require relative precise positioning of the bar relative to the snowmobile and the trailer in order to function according to design. The moving parts are also susceptible to seizure and/or failure after extended exposure to the elements and extreme weather conditions.

U.S. Pat. No. 5,203,655 to Persau discloses a snowmobile trailer having a hold down bar that extends across an intermediate portion of the trailer bed. The bar is secured in place by means of a bolt that is threaded into a hole formed through the trailer bed.

The Persau retention system requires an alignment of parts that is cumbersome, particularly in very cold weather. Also, after extended exposure to the elements and inclement weather, the threaded bolt assembly is susceptible to rusting and/or freezing in a locked configuration or at least to the extent that it becomes difficult to operate.

As is evident from the foregoing discussion of the Prior Art, a need remains for a snowmobile transport device that is convenient to operate and both reliable and durable in use. An object of the present invention is to provide such a device for the transport of snowmobiles and other ski-type vehicles. Another object of the present invention is to provide a retention system for snowmobiles and the like that is simple in construction, as well as in use, and that requires minimal modifications to existing trailers. These and other objects of the present invention will become apparent upon a detailed description of a preferred embodiment.

SUMMARY OF THE INVENTION

A preferred embodiment of the present invention provides a retention system for a snowmobile trailer. The rear end of a snowmobile is secured to the trailer by means known in the art. The skis of the snowmobile are retained relative to the trailer bed by a bar that is secured between a pair of brackets on the trailer by means not previously known in the art. In particular, a keyhole in each bracket cooperates with a flanged, distal end of the bar to allow passage of the distal end when the bar is in a first orientation relative to the bracket, but prevent passage of the distal end when the bar is in a second orientation relative to the bracket. A convenient handle is secured to an end of the bar opposite the flanged, distal end. The handle extends approximately perpendicular to the bar and aligns with the side of the trailer when the bar is in the second or locked orientation. A peg on the handle aligns with a hole in the side of the trailer bed to maintain the bar in the locked orientation.

Once a snowmobile is positioned on the trailer bed with the snowmobile skis disposed between the brackets, the flanged end of the bar is simply aligned relative to the keyhole in the near bracket and pushed through the keyhole in the near bracket, over the skis of the snowmobile, and through the keyhole in the far bracket. The handle on the bar is then rotated toward the locked orientation, while being pulled away from the trailer to obtain clearance between the peg and the trailer bed. Once in the second orientation, the handle is released, and the resilience of the bar biases the handle toward the trailer and the peg on the handle into the hole in the side of the trailer bed, thereby locking the handle in the second orientation.

The preferred embodiment of the present invention provides several advantages over the Prior Art snowmobile trailers and retention systems. For example, the locking bar of the present invention can be secured in place simply by insertion of the bar through the keyholes followed by a quarter turn of the bar. Also, the peg on the handle and the resilient stress in the bar ensure that the locking bar will not be accidentally dislodged from its locked position. Moreover, a sharp point on the flanged end of the locking bar facilitates removal of any ice or other debris that might otherwise block passage of the flanged end through the keyhole. Among other things, these features make the present invention easier to use in the type of inclement weather associated with snowmobiling. These and other advantages of the present invention will become apparent upon a more detailed description of the preferred embodiment.

BRIEF DESCRIPTION OF THE DRAWING

With reference to the Figures of the Drawing, wherein like numerals represent like parts and assemblies throughout the several views.

FIG. 10 is a top plan view of an alternative locking bar suitable for an alternative embodiment of the present invention;

FIG. 11 is a sectional view of an alternative side rail assembly, for use in conjunction with the alternative locking bar depicted in FIG. 10;

FIG. 12 is a top plan view of another alternative locking bar suitable for another alternative embodiment of the present invention; and FIG. 13 is a sectional view of another alternative side rail assembly, for use in conjunction with the alternative locking bar depicted in FIG. 12.

DETAILED DESCRIPTION OF THE PREFERRED EMBODIMENT

Figure 1:
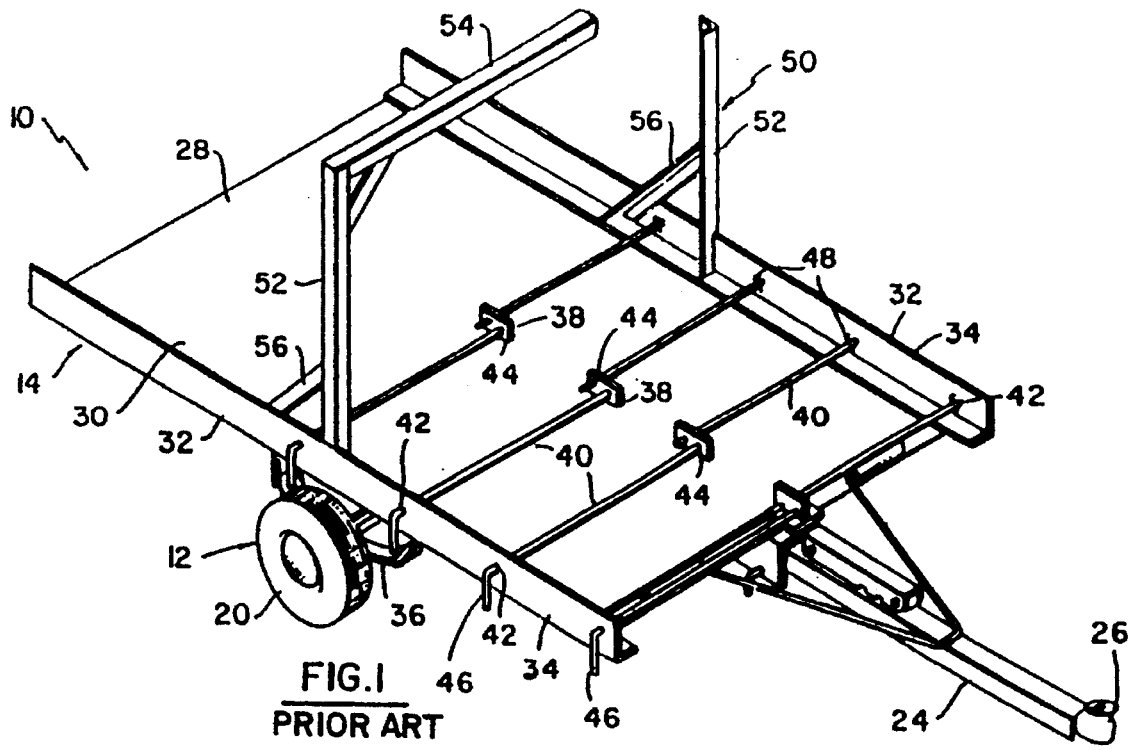
FIG. 1 is a perspective view of a Prior Art snowmobile trailer that is the subject of U.S. Pat. No. 3,885,690 to Van Slambrouck.
Figure 2:
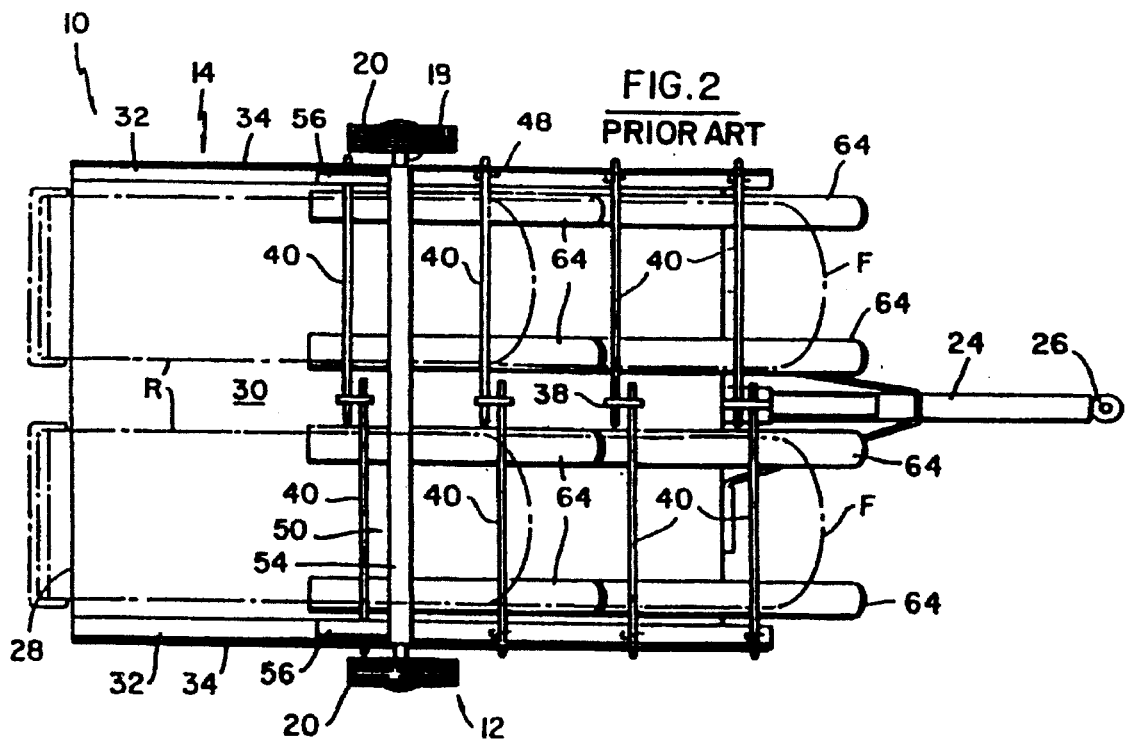
FIG. 2 is a top plan view of the Prior Art trailer depicted in FIG. 1, with dotted lines representing four snowmobiles mounted on the trailer.

A Prior Art trailer is shown in FIGS. 1 and 2 and described herein to facilitate appreciation of the novel features and inherent advantages of the present invention. The Prior Art trailer 10 generally includes a wheeled supporting assembly 12 and a supported assembly 14. The supporting assembly 12 includes a transverse axle 18 having ground engaging wheels 20 at each end thereof. An elongated draft bar 24 extends forwardly of the trailer 10 to provide a means for towing the trailer. A coupling device 26 is provided at the front end of the draft bar 24 to provide a means for attaching the draft bar 24 to a towing vehicle (not shown).

The supported assembly 14 includes a rectangular bed 28 having a flat, generally rectangular deck 30 capable of supporting one or more snowmobiles. A pair of elongate angle iron members 32 are secured to the bed 28 along opposite sides of the deck 30 with one flange 34 of each angle member 32 extending vertically upwardly along a respective side of the deck 30. Leaf springs 36 are provided beneath the bed 28 as a means for absorbing shock.

Brackets 38 are mounted midway between the sides of the deck 30 in spaced relation along a forward portion thereof. The brackets 38 receive hold down rods 40 and thereby provide a means for securing the skis of one or more snowmobiles relative to the deck 30. In particular, the rods 40 slide through apertures 42 in the upright flanges 34 of angle iron members 32 and through apertures 44 in the brackets 38. The rods 40 have outer end portions 46 which are turned at right angles to provide handles. The rods 40 are shown in their operative position for holding down the skis of one or more snowmobiles loaded on the trailer 10. The rods 40 may be secured against accidental removal by threading the distal ends of the rods into the apertures 44 in the brackets 38, or by inserting removable cotter pins 48 through transverse holes in the rods just inside the flanges 34.

The trailer 10 is provided with an inverted U-shaped frame 50 having a pair of vertical uprights 52 and a horizontal bar 54 extending between the upper ends of the uprights 52. The uprights 52 are secured at their lower ends to the angle iron members 32 about midway along the length of the deck 30. The uprights 52 extend vertically upwardly from the deck 30 and are preferably reinforced by suitable braces 56 for enhanced structural integrity. The inverted U-shaped frame 50 provides a rigid support for securing the rear ends of two forwardmost snowmobiles in an elevated position.

In FIG. 2, the Prior Art trailer 10 is shown supporting four snowmobiles, with the front ends of two rearward snowmobiles R nested under the rear ends of two forward snowmobiles F. When properly loaded on the trailer 10, the two forward snowmobiles F have their front skis 64 resting on the deck 30 under the two sets of rods 40 nearest the front of the trailer. The two rearward snowmobiles R have their skis resting upon the deck 30 under the two sets of rods 40 nearer the rear of the trailer.

Figure 3:
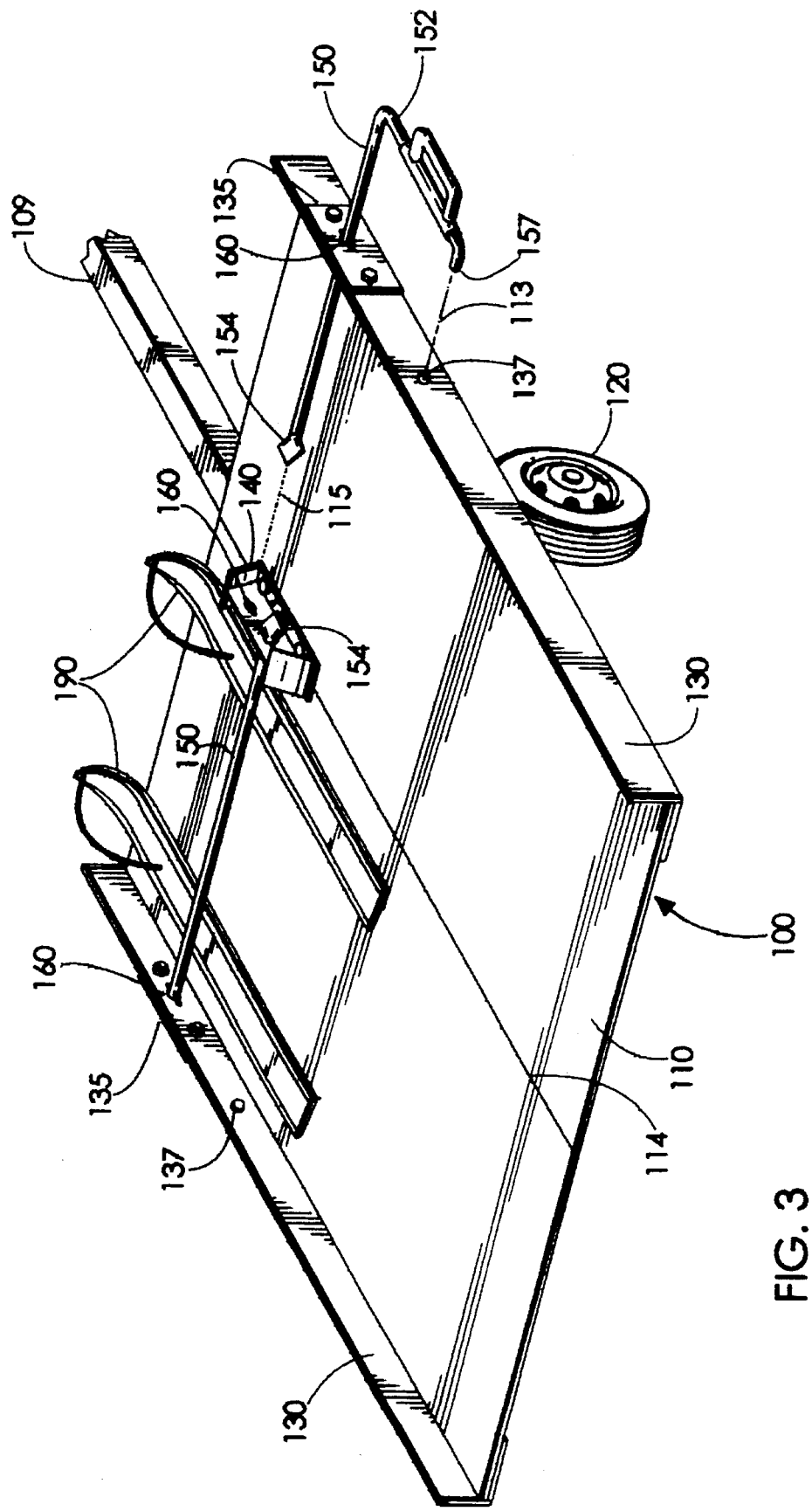
FIG. 3 is a perspective view of a preferred embodiment snowmobile trailer and retention system constructed according to the principles of the present invention.

A preferred embodiment snowmobile trailer constructed according to the principles of the present invention is designated as 100 in FIG. 3. The preferred embodiment trailer 100 is similar in many respects to the Prior Art trailer 10 shown in FIGS. 1 and 2. The preferred embodiment trailer 100 has a bed 110 supported above the ground by a pair of wheels, one of which is shown and designated as 120. A draw bar or tongue 109 extends forwardly of the trailer to provide a means for connecting the trailer 100 to a towing vehicle (not shown). The preferred embodiment trailer 100 also includes rails or brackets 130 disposed on opposite sides of the bed 110. Intermediate bracket assemblies 140 are mounted on the bed 110 approximately equidistant from the side rails 130. The principal difference between the preferred embodiment trailer 100 and the Prior Art trailer 10 (and the focus of the present invention) is the manner in which hold down bars 150 cooperate with the brackets 130 and 141 to capture snowmobile skis relative to the trailer bed 110. In view of the foregoing, those skilled in the art will recognize that only a few modifications would be necessary to install the retention system of the present invention onto the Prior Art trailer 10.

In the preferred embodiment 100, a side plate 135 is mounted by nuts and bolts to each side rail 130 proximate the front end of the trailer 100. Those skilled in the art will recognize that other types of fasteners would also suffice. For example, with angle iron side rails, welding is one of the many suitable options. In any event, a keyhole 160 is formed through each of the side plates 135 and each of the associated rails 130. Those skilled in the art will recognize that the side plates 135 are provided for enhanced structural integrity but are not absolutely necessary to the operation of the present invention. The configuration of the keyholes 160 is discussed below with reference to FIG. 6. The respective distances of the side plate keyholes 160 from the front of the trailer bed 110 should differ by an amount equal to the distance between the two keyholes formed through the intermediate bracket 141, as discussed in greater detail below.

Figure 5:
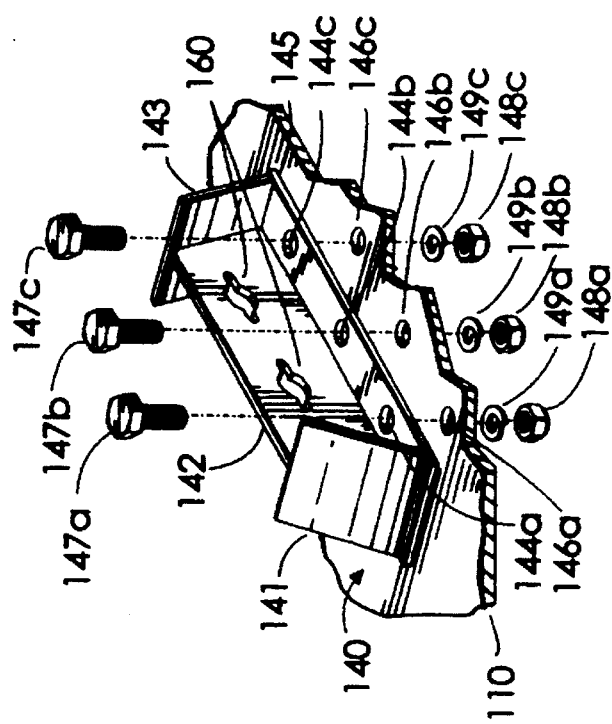
FIG. 5 is an exploded perspective view of a bracket assembly that is a component of the retention system depicted in FIG. 3.

An intermediate bracket assembly 140 is mounted along the centerline 114 of the trailer bed 110, approximately four feet from each of the side rails 130. As shown in greater detail in FIG. 5, the bracket assembly 140 includes a bracket made of angle iron and having a vertical member 142 and a horizontal member 143 that are approximately ¼ inch thick. Two keyholes 160 are formed through the vertical member 142 for reasons that are discussed below. The configuration of these keyholes corresponds to that of the keyholes formed through the side rails 130. Two bolt holes 144a and 144b are formed through the horizontal member 143 to provide a means for mounting the bracket 141 to the trailer bed 110. The bracket assembly 140 further includes an iron plate 145 that is preferably ¼ inch thick and similar in size and shape to the horizontal member 143. Two bolt holes 146a and 146b are formed through the plate 145 so as to be capable of alignment with the holes 144a and 144b through the horizontal member 143.

The intermediate bracket assembly 140 is mounted to the trailer bed 110 by placing the horizontal member 143 flat against the upper face of the trailer bed 110 in such a manner that the holes 144a and 144b overlie the centerline 114. Also, the bracket 141 should be approximately parallel to the side plates 135, and the keyholes 160 through the vertical member 142 should approximately align with the keyholes 160 through the side plates 135, as represented by reference line 115 in FIG. 3. With the holes 144a and 144b serving as a template, two holes (not shown) are then drilled or otherwise formed through the trailer bed 110. Bolts 147a and 147b are inserted through respective holes 144a and 144b and through corresponding holes in the trailer bed 110. The plate 145 is placed flat against the lower face of the trailer bed 110 in such a manner that the bolts 147a and 147b extend through the holes 146a and 146b, respectively. Nuts 148a and 148b and lock washers 149a and 149b mate with the bolts 147a and 147b, respectively, to rigidly secure the section 141 and the plate 145 to opposite faces of the trailer bed 110. Those skilled in the art will recognize that other types of fasteners are available for purposes of securing a bracket to a trailer bed, and that the invention is not limited in this regard.

As shown in FIG. 3, a locking bar 150 cooperates with the intermediate bracket 141 and one of the side plates 135 to capture a pair of skis 190 relative to the trailer bed 110. One of the locking bars 150 is shown in greater detail in FIG. 4. The locking bar 150 is preferably formed of 0.5 inch diameter spring steel. The locking bar 150 includes a first elongate segment 151 and a second elongate segment 152, which are integrally joined together by an elbow 153 to define an angle A of approximately 80 degrees therebetween. The first elongate segment 151 extends more than four feet from the elbow 153 to a distal end 154, which is shown in greater detail in FIG. 7. The distal end may be said to be a flanged end to the extent that it is flatter and wider than the cylindrical cross-section of the remainder of the first elongate segment 151. The tip 155 of the distal end 154 is a relatively sharp point that is suitable for chipping and penetrating ice and other debris that might otherwise block a keyhole 160.

Figure 6:
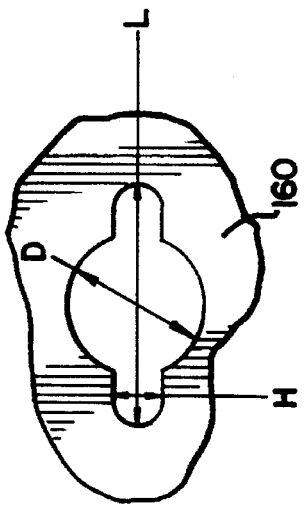
FIG. 6 is a front view of a keyhole formed through the bracket depicted in FIG. 5.

With reference to FIG. 6, the configuration of the keyhole 160 may be described as the combination of a circle and an elongate slot that are concentrically aligned relative to one another. The circle has a diameter D greater than the height H of the slot but less than the length L of the slot. The diameter of the first elongate segment 151 is slightly less than the diameter D of the circle portion of the keyhole 160, so the first elongate segment is capable of passing through the keyhole regardless of their orientation relative to one another. On the other hand, the width W of the flanged end 154 is greater than the diameter D of the circle portion of the keyhole 160, so the flanged end 154 is not capable of passing through the keyhole regardless of their orientation relative to one another. However, the width W of the flanged end 154 is less than the length L of the slot portion of the keyhole 160, and the thickness of the flanged end is less than the height H of the slot portion. Thus, the flanged end 154 is capable of passing through the keyhole 160 when they are properly aligned relative to one another. In this regard, the flanged end 154 functions as a key that can be selectively locked into and released from the keyhole 160.

Figure 8:
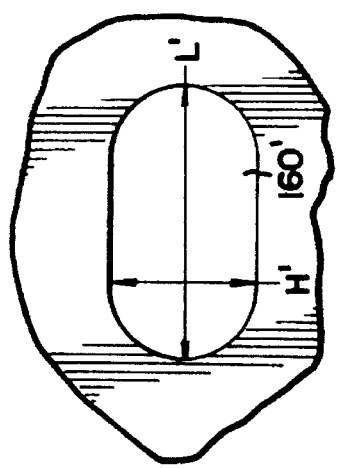
FIG. 8 is a front view of an alternative keyhole configuration suitable for an alternative embodiment of the present invention.
Figure 9:
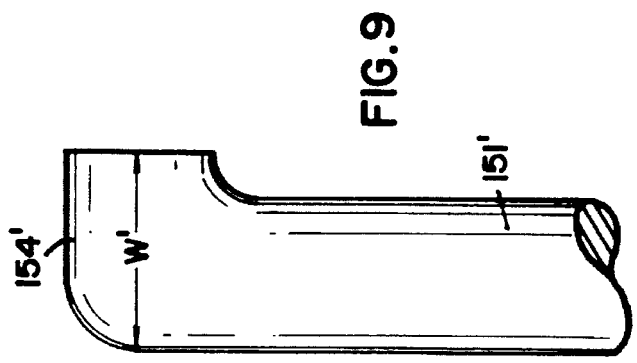
FIG. 9 is a side view of a distal end of an alternative locking bar, for use in conjunction with the alternative keyhole depicted in FIG. 8.
Figure 7:
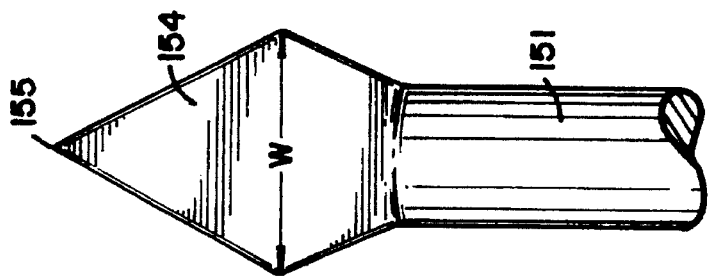
FIG. 7 is a side view of a distal end of the locking bar depicted in FIG. 4.

Those skilled in the art will recognize that the present invention is not limited to the specific key and keyhole configuration shown in FIGS. 6 and 7. For example, an alternative keyhole configuration is designated as 160' in FIG. 8, and a mating key is designated as 154' in FIG. 9. The keyhole 160' may be described as the configuration of a rectangle and a pair of semicircles having diameters that coincide with opposite sides of the rectangle. The configuration has an effective length L' and an effective height H'. The diameter of the first elongate segment 151' is slightly less than the effective height H' and significantly less than the effective length L', so the first elongate segment is capable of passing through the keyhole 160' regardless of their orientation relative to one another. However, the end 154' of the bar 151' is bent at a right angle relative to the length of the bar. As a result, the end 154' has an effective width W' greater than the effective height H' of the keyhole but less than the effective length L' of the keyhole. Thus, the end 154' is capable of passing through the keyhole 160' only when they are properly aligned relative to one another.

Figure 4:
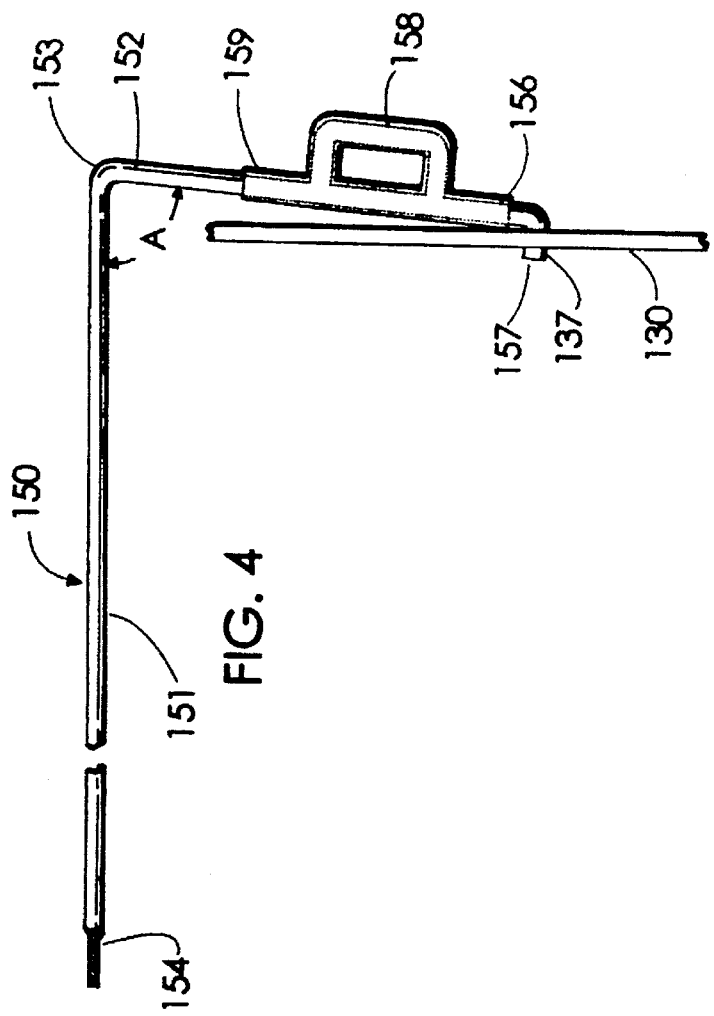
FIG. 4 is a top plan view of a locking bar that is a component of the retention system depicted in FIG. 3.

As shown in FIG. 4, the second elongate segment 152 extends approximately two feet from the elbow 153 to another elbow 156, which continues as a peg 157 extending approximately one inch in the same general direction as the first elongate segment 151. The diameter of the peg 157 is slightly less than that of holes 137 formed through the rails 130 rearward of the side plates 135. The relative positions of the peg 157 and the holes 137 are such that the peg 157 aligns with the holes 137 when the second elongate segment 152 is parallel to either of the rails 130. The distal ends of a U-shaped member 158 are welded to the second elongate segment 152 to provide a convenient handle for grasping and manipulating the bar 150. The handle 158 is disposed approximately three inches from the elbow 156 and extends away from the second elongate segment 152 in a direction substantially opposite to that of the first elongate segment 151 and the peg 157. The handle 158 and adjacent portions of the second elongate 152 are covered with a vinyl material 159 to provide a more reliable and comfortable grip and to enhance the appearance of the device.

In the preferred embodiment 100, the relationship between the handle 158, the key 154, and the keyholes 160 is such that the key is capable of passing through the keyholes when the handle occupies a vertical orientation, perpendicular to the side rail 130, and the key is incapable of passing through the keyholes when the handle occupies a horizontal orientation, parallel to the side rail. Thus, in order to capture a pair of skis 190 in the manner shown in FIG. 4, the bar 150 must first be positioned so that the key 154 is proximate the keyhole 160 through the side plate 135, and oriented so that the handle 158 is perpendicular to the trailer bed 110. The bar 150 is then pushed through the keyhole 160 in the side plate 135, over the skis 190 and through the keyhole 160 in the bracket 141. Next, the bar 150 is rotated about the axis of the first segment 151 in such a manner that the handle 158 approaches an orientation parallel to the side rail 130 and extending rearward from the side plate 135, thereby locking the key 154 relative to the bracket 141. At this point, the peg 157 encounters the side rail 130 due to the acute angle A formed by the elbow 153, as shown in FIG. 4. In order to gain clearance for the peg 157 relative to the side rail 130, the handle 158 is pulled away from the side rail 130, subject to the resilience of the bar 150. Once clearance is achieved, the handle 158 is rotated the remainder of the way to a parallel orientation relative to the side rail 130. Finally, the handle 158 is released, and the resilient force in the bar 150 biases the peg 157 into the hole 137 in the side rail 130, thereby positively securing the bar 150 in a locked position. The foregoing steps are simply reversed when the skis 190 are to be released.

Those skilled in the art will recognize that the existence of a keyhole through either of the side plates 135 is desirable but not absolutely necessary to practice the present invention. For example, a simple hole of circular cross-section could be provided through a side rail, and the key could be formed on the distal end of the bar after insertion of the bar through side plate and side rail. This variation of the present invention would tend to discourage theft of the bar 150.

FIGS. 10 and 11 show an alternative arrangement for positively securing a locking bar 250 relative to a side rail 230 in accordance with the present invention. In this alternative embodiment, a locking bar 250 includes a first elongate segment 151 and a second elongate segment 252, which are integrally joined together by an elbow 253 to define an angle B of approximately 100 degrees therebetween. The bar 250 is similar to the preferred embodiment bar 150 except for the magnitude of the angle B and the fact that the second segment 252 simply terminates in a distal end 257 rather than joining a second elbow. The distal end 257 selectively engages a substantially J-shaped member 237 that extends outward from the side rail 230. The J-shaped member 237 includes a first plate 231 having a first end that is welded to the side rail 230. The first plate 231 extends laterally from the welded first end to a second end that is joined to a second plate 232. The second plate 232 extends vertically between the first plate 231 and a third plate 233, which extends laterally back toward the side rail 230. The side rail 230 and a distal end of the third plate 233 define a gap 234 therebetween. The gap 234 is large enough to receive the distal end 257 of the handle segment 252.

The alternative locking bar 250 operates in much the same manner as the preferred embodiment locking bar 150. However, clearance is not a concern when the handle 258 is rotated toward alignment with the side rail 230. However, the handle 258 must be pushed toward the side rail 230 and against the side plate 235 so that the distal end 257 will pass through the gap 234. When the distal end 257 is safely within the confines of the J-shaped member, the handle 258 is released. Resilience in the bar 250 biases the distal end 257 against the second plate 232, beneath the third plate 233, thereby positively locking the bar 250 in position.

Another alternative locking bar arrangement is shown in FIGS. 12 and 13. An alternative locking bar 350 includes a first elongate segment 151 and a second elongate segment 352, which are integrally joined together by an elbow 353 to define an angle C of approximately 90 degrees therebetween. The bar 350 is similar to the preferred embodiment bar 150 except for the magnitude of the angle C and the fact that the second segment 352 simply terminates in a distal end 357 rather than joining a second elbow. The distal end 357 selectively engages a clip 337 that extends outward from the side rail 330. The clip 337 includes a first portion 331 that is welded to the side rail 330, and a second portion 332 that extends laterally from the first portion 331 and the rail 330. The second portion 332 has a profile that is similar in shape to an inverted horse shoe and thus, provides an upwardly facing gap 334. As the handle 358 is rotated into alignment with the side rail 330, the second portion 332 of the clip 337 receives the distal end 357 of the handle portion 352 by snap fit.

Although the present invention has been described with reference to particular embodiments and applications, those skilled in the art will recognize additional embodiments and applications that fall within the scope of the present invention. In this regard, the present invention is limited only to the extent of the appended claims.

What is claimed is:

1. A trailer for transporting at least one snowmobile, comprising:

a platform adapted to support the at least one snowmobile;

at least one side flange member rigidly affixed to and extending upwardly from the platform, the at least one side flange member providing a biasing orifice and a guide orifice;

a bracket assembly mounted on the platform so as to be located beside the at least one snowmobile, the bracket assembly including a horizontal member rigidly affixed to the platform and providing a keyhole; and a locking bar adapted to overlie at least a portion of the at least one snowmobile and engage the bracket assembly, the locking bar being biased to engage the at least one side flange member when in a locked position, wherein the keyhole is adapted to receive a first end of the locking bar only when the first end of the locking bar is oriented in a predetermined manner, and the guide orifice is aligned with the bracket assembly so as to direct the first end of the locking bar into contact with the bracket assembly, and the biasing orifice is adapted to engage a second, opposite end of the locking bar, thereby urging the locking bar to remain in a locked position.

2. The trailer of claim 1, wherein the locking bar is formed so as to include a handle that occupies a substantially horizontal position when the locking bar is in a locked position.

3. The trailer of claim 2, wherein the first end of the locking bar is formed as a key that is shaped so as to enter the keyhole of the bracket assembly when the locking bar handle occupies a substantially vertical orientation.

4. The trailer of claim 3, wherein the locking bar is formed of a resilient material that provides a biasing force to urge the locking bar to remain in a locked position.

5. The trailer of claim 4, wherein the second end of the locking bar is formed as a peg that is adapted to engage the biasing orifice.

6. The trailer of claim 5, wherein the locking bar further comprises:

(a) a first, key segment formed as an elongate rod terminating at the first end of the locking bar;

(b) a second, handle segment formed as an elongate rod to which the handle and the second end of the locking bar are affixed; and (c) an elbow that joins the key segment and the handle segment.

7. The trailer of claim 6, wherein the elbow is formed at an angle of approximately eighty degrees.

8. A trailer for transporting at least one snowmobile, comprising:

a platform sized and configured to support the at least one snowmobile;

a first bracket secured to the platform, the first bracket providing a keyhole;

a locking bar having a handle end and a distal end, wherein the locking bar is adapted to overlie at least a portion of the at least one snowmobile, and the distal end is configured to pass through the keyhole when in a first orientation relative thereto, and to resist passage through the keyhole when in a second orientation relative thereto;

a second bracket secured to the platform, the second bracket cooperating with the handle end of the locking bar to limit movement of the handle end toward the first bracket when the distal end is disposed on an opposite side of the keyhole; and a locking means for locking the locking bar in the second orientation relative to the keyhole.

9. The trailer of claim 8, wherein the locking means includes a biasing orifice in the second bracket and a peg on the handle end of the locking bar.

10. The trailer of claim 8, wherein the second bracket provides a guide orifice similar in size and configuration to the keyhole.

11. A trailer for transporting at least one snowmobile, comprising:

a platform sized and configured to support the at least one snowmobile;

a first bracket secured to the platform, the first bracket providing a keyhole;

a locking bar having a handle end and a distal end, wherein the locking bar is adapted to overlie at least a portion of the at least one snowmobile, and the distal end is configured to pass through the keyhole when in a first orientation relative thereto, and to resist passage through the keyhole when in a second orientation relative thereto, wherein the distal end has a pointed tip to facilitate removal of foreign material which might otherwise obstruct passage of the distal end through the keyhole; and a second bracket secured to the platform, the second bracket cooperating with the handle end of the locking bar to limit movement of the handle end toward the first bracket when the distal end is disposed on an opposite side of the keyhole.

12. A trailer for transporting at least one snowmobile, comprising:

a platform sized and configured to support the at least one snowmobile;

a first bracket secured to the platform;

a second bracket secured to the platform;

a locking bar having a distal end proximate the first bracket, a handle end proximate the second bracket, and an intermediate portion which overlies at least a portion of the at least one snowmobile;

a resilient locking means for resiliently locking the locking bar between the first bracket and the second bracket, wherein the locking bar extends through a keyhole in the first bracket, and the locking bar rotates into and out of a locked orientation between the first bracket and the second bracket, and the distal end is configured to resist passage through the keyhole when the locking bar occupies a first, locked orientation relative to the keyhole, and to pass through the keyhole when the locking bar occupies a second, unlocked orientation relative to the keyhole.

13. The trailer of claim 12, wherein the locking bar extends through a guide orifice in the second bracket.

14. The trailer of claim 12, wherein the distal end cooperates with the first bracket and the handle end cooperates with the second bracket to place the locking bar in tension when locked between the first bracket and the second bracket.

15. The trailer of claim 12, wherein when the locking bar is unstressed, the handle end extends at an acute angle relative to the intermediate portion of the locking bar.

16. The trailer of claim 15, wherein when the locking bar is locked between the first bracket and the second bracket, the handle end extends perpendicular to the intermediate portion of the locking bar.

* * * * *